Jan. 16, 1962 F. M. PEARCE 3,017,542
BINARY COUNTING ARRANGEMENTS
Filed Sept. 18, 1957

INVENTOR
FREDERICK MELVILLE PEARCE
ATTORNEY

United States Patent Office 3,017,542 Patented Jan. 16, 1962

3,017,542

BINARY COUNTING ARRANGEMENTS

Frederick Melville Pearce, Hale, England, assignor to Metropolitan-Vickers Electrical Company Limited, London, England, a British company Filed Sept. 18, 1957, Ser. No. 684,682
Claims priority, application Great Britain Sept. 20, 1956
7 Claims. (Cl. 317—140)

Figure 1:
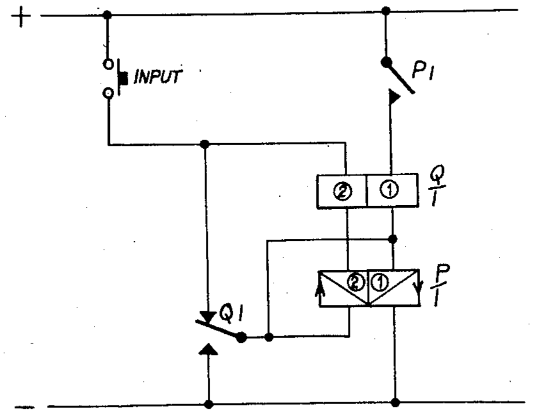

This invention relates to arrangements for counting on the binary scale in which electro-magnetic relays are employed in the counting circuits.

The principle of counting on the binary scale is well known and is particularly suited to representations by electro-magnetic relay circuits having two stable states corresponding to the two values "0" and "1" of a binary digit.

It is an object of the present invention to provide an improved binary counting arrangement employing relays.

According to the present invention a relay circuit having two states of stability comprises a magnetic lock-on relay having two operating coils each of which is adapted on energisation in one direction to actuate a contact to move to one of two positions (e.g. open or closed), to indicate a count of "0" or "1," and on energisation in the opposite direction to actuate the contact to move to the other position, together with an auxiliary relay arranged so that on the cessation of each input pulse it provides a path for the next input pulse through the alternate operating coil of the lock-on relay, the direction of the paths of the input pulses through the respective coils being such that successive pulses move the contact into alternate positions.

The relays may be connected between two supply lines which in operation are continuously energised. To provide input pulses to the relay circuit so as to change the circuit to its alternate stability state switch means may be provided to momentarily connect an appropriate point in the circuit to a selected supply line.

The auxiliary relay preferably has two operating coils each of which coils is respectively in series with a respective coil of the lock-on relay.

To provide a complete binary counter a chain of such circuit arrangements is provided each of said circuits corresponding to a digit stage. The chain is energised from a common input line to which each stage is individually connected through gate contacts operated by the auxiliary relay of the previous stage when that stage is in the "1" state, all said gate contacts being connected in series so that a relay circuit can operate only when all previous stages are in the "1" state, whereby the counter indicates the sum of successive input pulses fed to the common input line.

It is possible to adapt such a binary counter for subtraction and this can be achieved by providing an additional input line along which subtraction pulses may be fed. Successive stages of the chain are individually connected to this additional common input line through gate contacts operated by the auxiliary relays of the previous stages when those stages are in the "0" state, said gate contacts being connected in series so that a stage can change its count only when all previous stages in the chain are in the "0" state.

Preferably a single set of gate contacts are associated with each relay circuit to connect said circuit to either the adding line or the subtracting line, depending on whether the previous stage is in the "1" or the "0" state.

Thus the binary counter described can provide a means of indicating the arithmetic sum of additive and subtractive pulses supplied to it by two separate input channels.

Figure 2:
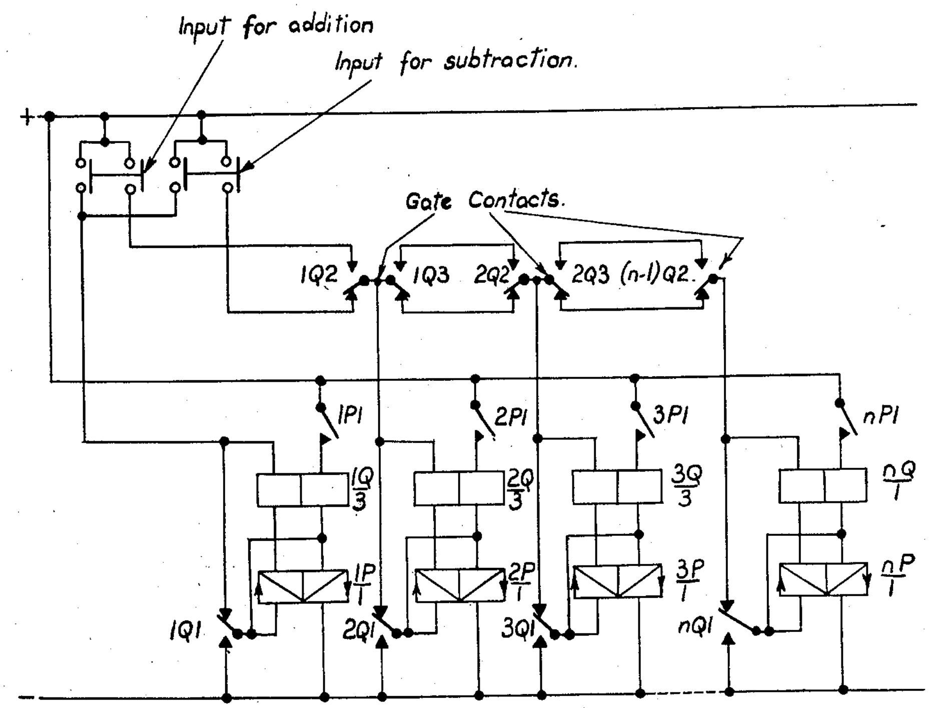

In order that the invention may be more fully understood reference will now be made to the drawing accompanying this specification, in which FIG. 1 shows a relay circuit arrangement for a single stage and FIG. 2 shows a complete counting chain for both addition and subtraction.

Referring to FIG. 1 there is shown therein two electro-magnetic relays P and Q. Relay P is of a type having two stable positions for its armature and commonly known as the "magnetic lock-on" type. It has two operating coils which are similar in their function and either can be used to cause the relay to operate or reset, depending on the direction of current flow. Relay Q, which is the auxiliary relay, is of the self resetting type and again has two operating coils and this relay will operate with current applied to either or both coils (provided in the latter case that the currents are in the same direction electrically). To understand the operation of the circuit consider that the relay Q is in the unoperated position and the relay P is in the reset or "0" position. (The relay circuit will represent the value 1 and P assumes the operated position.)

Suppose now that the input connection is made positive by the closing of the input switch shown, causing current to flow through coil 1 of P in the direction of the arrow; relay P will then operate and close its contact P1. No further operation will occur so long as this state is maintained. It will be observed that no current can flow in coil 1 of relay Q because a positive connection is made to either side, nor can any current flow in the coils 2 of relays P or Q because these coils are short-circuited by the closed contacts Q1.

Suppose now that the input switch is opened, representing the end of the input impulse; this action has the effect of removing the positive potential from the lower side of coil 1 of relay Q and a circuit now exists through the contact P1, coil 1 of Q and coil 1 of P to negative. Relay Q will therefore operate and in so doing change the position of its changeover contact Q1, thereby short-circuiting coil 1 of P and preparing coils 2 of relays P and Q to receive current on the next impulse. The relay circuit is now in its second stable state representing the value 1.

Suppose the input connection is made positive for a second time; current will now flow through the series connected coils 2 of relays P and Q. Current flows against the arrow for relay P and causes this relay to reset; no change in the state of relay Q occurs as this is held energised by current through its second coil even though the current in its first coil is interrupted by the re-opening of the contact P1.

When the input circuit is again opened, relay Q is de-energised and will reset thereby returning the circuit to its state before the commencement of the first input signal.

From the foregoing it will be seen that before the first impulse relay P was in the reset position and the relay circuit was deemed to have the value 0. After the first impulse relay P moved to the operated position and the relay circuit represented the value 1. After the second impulse relay P had again reset and the circuit reverted to its original value 0.

FIGURE 2 shows the circuit diagram for a complete counting chain. It will be seen that the first stage is connected to receive every additive or subtractive input signal but that stages of high power receive additive or subtractive impulses only as controlled by the position of series gate contacts operated by the auxiliary relay coils of each preceding stage. Thus the input to the second stage is controlled by gate contacts of the auxiliary coil of the first stage, and the input to the third stage is controlled by gate contacts of the auxiliary relay coils of the first and second stages, and so on for the fourth and subsequent stages.

Consider the application of an addition pulse input to the counter. This will cause the first stage to change its state from 0 to 1 in the manner already described. The gate contact 1Q2 prevents the addition pulse being applied to the second and higher stages so that the first stage is the only one to change, and the number represented is 1. On the cessation of the input pulse which changes the first stage from 0 to 1 auxiliary relay coil 1Q becomes energized and switches the two gate contacts 1Q2 and 1Q3 to their opposite positions. Contact 1Q2 now completes a path from the addition input to the second stage of the counter. The arrival of a second addition pulse causes the first stage to change its state from 1 to 0 and the second stage to respond and change from 0 to 1. No higher elements are affected because the gate contacts 2Q2 are open until the end of the second positive impulse; the number represented is therefore 10. On the cessation of the second input pulse relay coil 1Q becomes de-energized as the first stage has changed from 1 to 0 and relay coil 2Q becomes energized as the second stage has changed from 0 to 1. Gate contacts 1Q2 and 1Q3 thus prevent the subsequent pulse passing beyond the first stage although gate contacts 2Q2 and 2Q3 are switched upwards. The arrival of a third addition pulse causes operation of only the first stage (as in the case of the first impulse) and the number represented is 11. On the cessation of the third addition pulse relay coils 1Q and 2Q become energized and now all of the contacts 1Q2, 1Q3, 2Q2 and 2Q3 are switched upwards, thus completing a path for the first three stages in parallel. A fourth addition pulse causes the resetting of the first two stages to 0 and the operation of the third to 1, so that the number now represented is 100. It will be seen that the count is proceeding upon the binary principles and can continue in this manner indefinitely.

Suppose, however, that at this point a subtraction pulse is introduced via the alternative input channel; the positions of the gate contacts are such that the first three stages respond and change their state, whereas due to contact 3Q3 being upwards no higher stages are affected; the position at the end of the impulse with stages 1 and 2 operated and stage 3 reset, is the binary number 11. The path for the subtractive input is now completed as far as the first stage only and a further subtractive impulse would now be channelled only to the first stage leaving the second digit in the operated state (number 10). The changeover of the first stage to 0 causes contacts 1Q2 and 1Q3 to be switched downwards and hence it will be seen that the next subtractive pulse would be received by the first two digits alone and would cause each to change its state (number 1) while a final impulse would be received only by the first digit and would return the count to zero.

In general, the gate contacts $(n-1)$ Q2 and $(n-1)$ Q3 controlled by the auxiliary relay $(n-1$ Q of the $(n-1)$th stage serve to provide a path for addition pulses from the $(n-1)$th to the $n$th stage when the $(n-1)$th stage has a count of "1," and to provide a path for subtraction pulses when the $(n-1)$th stage has a count of "0." Thus when all $(n-1)$ stages have a count of "1," an addition pulse changes the state of all $n$ stages. This satisfies the requirement for binary addition. Also when all $(n-1)$ stages have a count of "0" a subtraction pulse changes the state of all of the $n$ stages. This satisfies the requirement for binary subtraction.

What I claim is:

1. A relay circuit having two states of stability comprising a magnetic lock-on relay having two operating coils and a contact, each of which operating coils is adapted on energisation in one direction to actuate a contact to move to the closed position, and on energisation in the opposite direction to actuate said contact to move to the open position, together with an auxiliary relay having two operating coils and contact means, said operating coils of said auxiliary relay each being in series with a respective coil of said lock-on relay so that two pairs of series-connected coils are formed, two supply lines which in operation are continuously energised, switch means the closure of which provides input pulses, a connection from one pair of coils to a selected supply line, said connection being formed by the closure of said lock-on relay contact, a connection from the other pair of coils to said selected supply line, said connection being formed by closure of said switch means, said auxiliary relay contact means being arranged on energisation and de-energisation of said auxiliary relay to provide a path for input pulses through alternate operating coils of said lock-on relay, the direction of the paths of the input pulses through the respective coils being such that successive pulses move said contact into alternate positions and in which said auxiliary relay is arranged to be energised on cessation of alternate input pulses and to be de-energised on the cessation of intermediate input pulses.

2. A relay circuit as claimed in claim 1, in which said auxiliary relay contact means serve to short-circuit the auxiliary relay coils during alternate input pulses and serve to maintain a circuit through at least one coil of said auxiliary relay during intermediate input pulses.

3. A relay circuit comprising a magnetic lock-on relay having two operating coils and a contact, switch means for supplying input pulses to the circuit, an auxiliary relay having two operating coils and a change-over contact which provides a path for alternate input pulses through one operating coil of said lock-on relay and a path for intermediate input pulses through the other operating coil of said lock-on relay providing for moving the lock-on relay contact into opposite open and closed positions by successive input pulses, one of the operating coils of said auxiliary relay being short-circuited by said switch means during alternate pulses and being held energized when alternate input pulses cease through the lock-on relay contact in its closed position so as to operate said change-over contact to prepare the path for intermediate input pulses through one lock-on relay coil, and the other of the operating coils of the auxiliary relay being energized by said intermediate pulses and thereafter being de-energized on the cessation of intermediate pulses to prepare the path for alternate pulses through the other operating coil of the lock-on relay.

4. A relay circuit comprising a magnetic lock-on relay having two operating coils and a contact, two supply lines which in operation are continuously energized by a potential difference being applied between them, switch means for connecting a point in the circuit to a selected supply line to provide input pulses and an auxiliary relay having two operating coils and a change-over contact which provides a path for successive input pulses through alternate operating coils of the lock-on relay whereby successive input pulses move the lock-on relay contact into opposite open and closed positions, one of said operating coils of said auxiliary relay being arranged to be held energized through said contact of said lock-on relay when closed to operate the change-over contact on the disconnection of said point in the circuit from said selected supply line so as to complete the path for the subsequent input pulse through the other operating coil of the auxiliary relay and the required lock-on relay coil in series prior to the arrival of the subsequent input pulse.

5. A relay circuit comprising a magnetic lock-on relay having two operating coils and a contact, an auxiliary relay having two operating coils and a change-over contact which has back and front contacts, switch means for applying input pulses through two alternative paths, one of said alternative paths comprising the back contact of said changeover contact and one of the operating coils of said lock-on relay connected so that energization thereof moves the contact of the lock-on relay to its closed position, and the other of said alternative paths comprising an operating coil of said auxiliary relay and the other of the operating coils of said lock-on relay connected so that energization thereof moves the contact of the lock-on relay to its open position and the front contact of said change-over contact, said one of said alternative paths being selected when said auxiliary relay is de-energized and said other of said alternative paths being selected when said auxiliary relay is de-energized, and a connection through the contact of said lock-on relay and the other operating coil of said auxiliary relay across said input switch means and said change-over contact, said connection being short-circuited by said switch means and the back contacts of said change-over contact in series during application of input pulses through said one of said alternative paths to prevent energization of said other operating coil of said auxiliary relay until cessation of said input pulses through said one of said alternative paths, and said connection maintaining said auxiliary relay energized through the front contacts of said change-over contact when said contact of said lock-on relay is closed.

6. A binary counter comprising a plurality of cascaded stages formed by a chain of two stability state relay circuits, each of said relay circuits comprising a magnetic lock-on relay having two operating coils and a contact, an auxiliary relay having two operating coils and contact means, said operating coils of said auxiliary relay each being in series with a respective coil of said lock-on relay so that two pairs of series-connected coils are formed, two supply lines which in operation are continuously energized, an input connection for each relay circuit, a connection from one pair of coils to a selected supply line formed by the closure of said lock-on relay contact, a connection from the other pair of coils to said input connection, said auxiliary relay contact means being arranged on energization and de-energization of said auxiliary relay to provide a path for input pulses through alternate operating coils of said lock-on relay in directions such that successive pulses move said lock-on relay contact into alternate positions, said auxiliary relay being arranged to be energized on cessation of alternate input pulses to the stage and to be de-energized on cessation of intermediate input pulses to the stage, gate contacts controlled by said auxiliary relay input means, an input pulse line comprising a connection from said selected supply line through said input means and through the gate contacts of all stages in series, said input connections of each stage being to points on said input pulse line such that a path from said selected supply line to each relay stage can only be completed when said input means and the gate contacts of all the previous stages are closed.

7. A binary counter comprising a plurality of cascaded stages formed by a chain of two stability state relay circuits, each of said relay circuits comprising a magnetic lock-on relay having two operating coils and a contact, an auxiliary relay having two operating coils and contact means, said operating coils of said auxiliary relay each being in series with a respective coil of said lock-on relay so that two pairs of series-connected coils are formed, two supply lines which in operation are continuously energized, an input connection for each relay circuit, a connection from one pair of coils to a selected supply line formed by the closure of said lock-on relay contact, a connection from the other pair of coils to said input connection, said auxiliary relay contact means being arranged on energization and deenergization of said auxiliary relay to provide a path for input pulses through alternate operating coils of said lock-on relay in directions such that successive pulses move said lock-on relay contact into alternate positions, said auxiliary relay being arranged to be energized on cessation of alternate input pulses to the stage and to be de-energized on cessation of intermediate input pulses to the stage, changeover gate contacts controlled by said auxiliary relay and connected to said input connection, addition input means, an addition pulse line comprising a connection from said selected supply line through said addition input means and through the changeover gate contacts of all stages in series when in one position, which addition pulse line provides a path from said selected supply line to a stage on closure of said addition input means only when the changeover gate contacts of all the previous stages are in said one position, subtraction input means, a subtraction pulse supply line comprising a connection from said selected supply line through said subtraction input means and through the changeover gate contacts of all stages in series when in the opposite position, which subtraction pulse line provides a path from said selected supply line to a stage on closure of said subtraction input means only when the changeover gate contacts of all the previous stages are in said other position.

References Cited in the file of this patent

UNITED STATES PATENTS

| | | |
|---|---|---|
| 2,389,275 | Rayner et al. | Nov. 20, 1945 |
| 2,616,958 | Westerveld | Nov. 4, 1952 |
| 2,636,932 | Oberman et al. | Apr. 28, 1953 |
| 2,767,910 | Vande Sande | Oct. 3, 1956 |

FOREIGN PATENTS

| | | |
|---|---|---|
| 588,402 | Great Britain | May 21, 1947 |